United States Patent [19]

Serizawa

[11] Patent Number: 5,786,549

[45] Date of Patent: Jul. 28, 1998

[54] LOW PROFILE LOAD SENSOR OF UNITARY CONSTRUCTION

[75] Inventor: Takasi Serizawa, Tokyo, Japan

[73] Assignee: Tanita Corporation, Japan

[21] Appl. No.: 602,841

[22] PCT Filed: Feb. 28, 1995

[86] PCT No.: PCT/JP95/00302

§ 371 Date: Feb. 27, 1996

§ 102(e) Date: Feb. 27, 1996

[87] PCT Pub. No.: WO95/25262

PCT Pub. Date: Sep. 21, 1995

[30] Foreign Application Priority Data

Mar. 17, 1994 [JP] Japan ............... 6-071249

[51] Int. Cl.$^6$ ........................ G01G 3/147
[52] U.S. Cl. ........................ 177/211; 177/229
[58] Field of Search ........................ 177/211, 229, 177/256, 210 C, DIG. 9; 73/862.621, 862.626, 862.632, 862.633, 862.634, 862.636

[56] References Cited

U.S. PATENT DOCUMENTS

| 3,022,845 | 2/1962 | Provi | 177/256 |
|---|---|---|---|
| 4,381,826 | 5/1983 | Kupper | 177/211 |
| 4,386,671 | 6/1983 | Dyck | 177/208 |
| 4,548,086 | 10/1985 | Kästel | 73/862.626 |
| 4,641,539 | 2/1987 | Vilimek | 73/862.63 |
| 4,765,422 | 8/1988 | Hoffmann | 177/211 |
| 4,846,294 | 7/1989 | Sato | 73/862.621 |
| 4,979,580 | 12/1990 | Lockery | 177/211 |
| 5,095,764 | 3/1992 | Saner | 73/862.59 |
| 5,205,370 | 4/1993 | Paul et al. | 177/256 |

FOREIGN PATENT DOCUMENTS

| 0 322 543 | 7/1989 | European Pat. Off. . |
|---|---|---|
| 61-36891 | 10/1986 | Japan . |
| 62-3697 | 1/1987 | Japan . |
| 63-205524 | 8/1988 | Japan . |
| 64-43729 | 2/1989 | Japan . |
| 64-44821 | 2/1989 | Japan . |
| 9519095.3 | 3/1994 | Japan . |

OTHER PUBLICATIONS

PCT International Search Report.

*Primary Examiner*—Michael L. Gellner
*Assistant Examiner*—Randy W. Gibson
*Attorney, Agent, or Firm*—Evenson, McKeown, Edwards & Lenahan, P.L.L.C.

[57] ABSTRACT

Disclosed is a low profile load sensor comprising, an outer frame for mounting on a base of a weighing scale; platform mounting members for connecting to a platform of the weighing scale, a sensing device, and a plurality of load transmission beams positioned between the outer frame and the platform mounting members for receiving a load applied to the platform on a plurality of load-applied-points through the platform mounting members in distributed condition. The load is supported on a plurality of fulcrums in distributed condition and collectively transmitted to the sensing device which then produces a strain or a deformation responsive to the load. The load transmission beams are coupled to the outer frame and the platform mounting members via torsional elastic couplings, respectively.

7 Claims, 3 Drawing Sheets

LOW PROFILE LOAD SENSOR OF UNITARY CONSTRUCTION

TECHNICAL FIELD

The present invention relates generally to a load sensor for use with a weighing scale and, more particularly, to a low profile load sensor of unitary construction.

BACKGROUND ART

A low profile weighing scale having one load sensor has such tendency that may produce a different weight value depending upon the position to which a load is applied due to the fact that the load sensor can not have sufficient thickness. Such phenomenon is referred to as "positional error". Therefore it is a common practice that, in a flat-type weighing scale, a platform is mounted on four load sensors and the output of such load sensors are summed. However, such flat-type scale has deficiencies in that it adds the production cost because a plurality of load sensors must be used and they must have the uniform output levels.

A simple type scale, such as a weighing scale for measuring the weight of persons, having a weighing range of 100 kg to 200 kg is generally designed in such manner that load-applied-points and fulcrums are provided on four corners of the scale to receive the load in distributed condition, and levers (load transmission beams) are provided to collectively transmit the load to a point at which one sensing device is positioned.

Such simple low profile scale (or lever type scale) commonly uses a knife edge member for an arrangement of load-applied-point and fulcrum. However, such knife edge member is unstable in construction, requires several components, and accordingly, increases the number of steps of assembling. In order to solve such problems, that is, for the purpose of eliminating the unstable construction and of reducing in number of the components and the steps of assembling, various kinds of low profile scales including integrated load sensors have been proposed wherein a flexible hinge coupling or so called "an elastic coupling" is formed in a portion of the lever member for the arrangement of fulcrum and load-applied-point.

Prior art integrated load sensors using such elastic couplings are disclosed in, for example, Japanese Utility Model Publication No. 61-36891; Japanese Patent Laid-Open No. 64-43729; Japanese Utility Model Publication No. 62-3697; and Japanese Patent Laid-Open No. 63-205524.

A load sensor as disclosed in said Japanese Utility Model Publication No. 61-36891 uses the flexure of a leaf spring for the hinge coupling. Such load sensor has, however, deficiencies in that, for a scale of smaller weighing range, a stress of flexure of the leaf spring would be added to a load to be measured, which prevents the precise transmission of the load, and therefore, adversely affects the reliablility of measurement.

Another load sensor for a weighing scale in which the hinge coupling is formed by making the material thinner with a press machining to give an elasticity, as disclosed in said Japanese Patent Laid-Open No. 64-43729, can not handle the change in length (or horizontal distance) due to the flexure, thereby increasing the burden on the flexible portion. Furthermore, a load sensor in which upper and lower parallel slots are provided and vertical leaf springs are positioned, as disclosed in said Japanese Utility Model Publication No. 61-36891, requires a thicker member for giving an effective length of the spring, which limits the realization of low profile scale. In this case, a special machining process for making the vertical leaf spring is additionally required. A load sensor as disclosed in said Japanese Utility Model Publication No. 62-3697 also has the same problems.

DISCLOSURE OF INVENTION

In view of the above, it is an object of the present invention to solve the above-mentioned problems of hinge couplings of the prior art lever type weighing scale by providing a new and improved low profile load sensor having features of high precision and low cost.

According to the present invention, a low profile load sensor for use with a weighing scale having a base and a platform, which comprises:

an outer frame for mounting on said base;

platform mounting members for connecting to said platform;

a sensing device; and a plurality of load transmission beams positioned between said outer frame and said platform mounting members for receiving a load applied to said platform on a plurality of load-applied-points through said platform mounting members in distributed condition, for supporting said load on a plurality of fulcrums in distributed condition, and for collectively transmitting said load to said sensing device which then produces a strain or a deformation responsive to said load;

wherein said load transmission beams are coupled to said outer frame and said platform mounting members via torsional elastic couplings, respectively.

According to the present invention, the load sensor may be produced by removal of unnecessary portions from a single flat plate, or by a moulding process using molten material or powder material in order to form the outer frame, the platform mounting members, the load transmission beams, the sensing device and the torsional elastic couplings. More specifically, the torsional elastic coupling is formed by an elongated stylus-like member provided between parallel slots which are closely spaced apart and extend in opposite direction. The torsional elastic coupling becomes deformed in responsive to a torsion of the stylus-like member.

According to the present invention, the sensitivity of the torsional elastic coupling is extremely higher (several hundread times greater) as compared to the prior art flexible hinge coupling. In addition, because of the elastic portion formed by the parallel slots which are closely spaced apart and extend in opposite direction, an effective length of the elastic portion can be assured while keeping the low profile configuration. This also contributes to achieve an advantageous low profile mechanism that can follow any horizontal displacement of the beams and has less transmission loss.

BRIEF DESCRIPTION OF DRAWINGS

The present invention will be described below in more detail with reference to the accompanying drawings in which.

BEST MODE FOR CARRYING OUT THE INVENTION

In FIGS. 1, 3, 4 and 5, the cross-hatched portions of low profile load sensors represent the component parts remaining after removal of unnecessary parts or the component parts produced by a moulding process.

Figure 1:
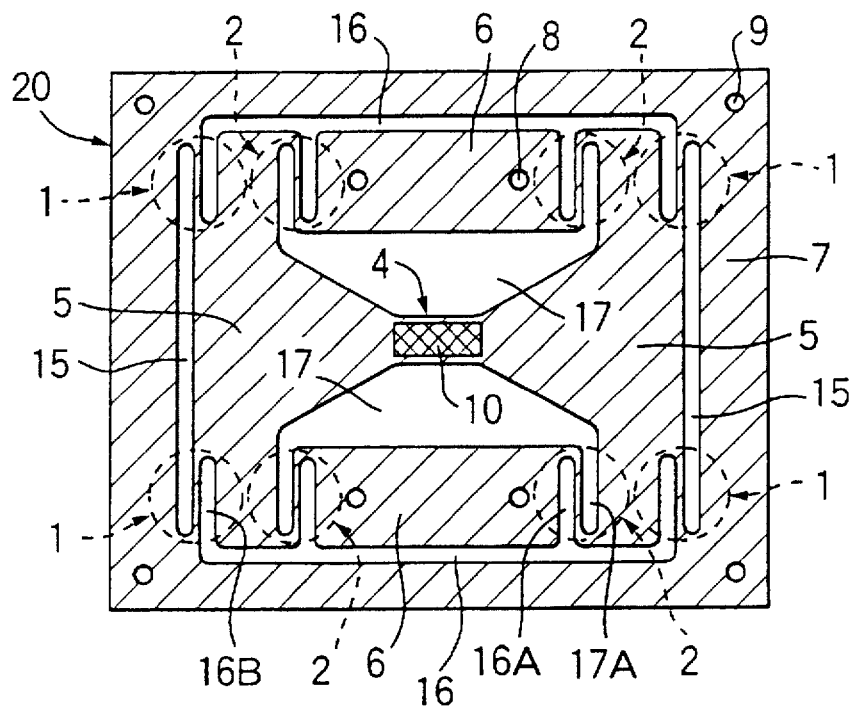
FIG. 1 is a plan view showing a low-profile load sensor according to one embodiment of the present invention.

FIG. 1 shows a basic construction of a low-profile load sensor according to one embodiment of the present invention. The low-profile load sensor comprising a rectangular flat plate 20 includes four orthgonal slots 15 and 16 at the peripheral portion thereof; four first tortional elastic couplings 1 each acting as a fulcrum and formed in such manner that the end 16B of the slot 16 is bent so that it is positioned in parallel to and closely spaced to the slot 15 with only an elongated stylus-like portion remaining therebetween; and an outer frame 7 for mounting on a base of a scale, which frame is connected to a load transmission section only by said first tortional elastic couplings.

The load transmission section comprises two right and left levers (load transmission beams) 5 facing to each other at middle enlarged portions of two inner holes 17; and two front and rear parallel members 6 on which a platform is mounted. The levers 5 and the platform mounting members 6 are connected by second tortional elastic couplings 2 which act as load-applied-points. The second tortional elastic coupling 2 is formed in such manner that a slot 17A extending from said inner hole 17 is positioned in parallel to and closely spaced to a slot 16A extending from said peripheral slot 16 in the opposite direction to said slot 17A, thereby producing an elongated stylus-like portion therebetween.

Removal of the unnecessary portions may be effected by a mechanical process such as a pressing, a stamping and a cutting; or a chemical process such as an etching using chemical agents; or an electrical process such as a discharge machining and a sputtering. Alternatively, moulding of molten material or powder material may be used to produce the desired shape.

A sensing device 4 having a small width is formed between the enlarged portions of two inner holes 17 and is coupled to the ends of the load transmission beams 5 which are spaced apart and are facing to each other. The sensing device 4 includes strain gauges 10 affixed on both surfaces thereof.

Figure 2:
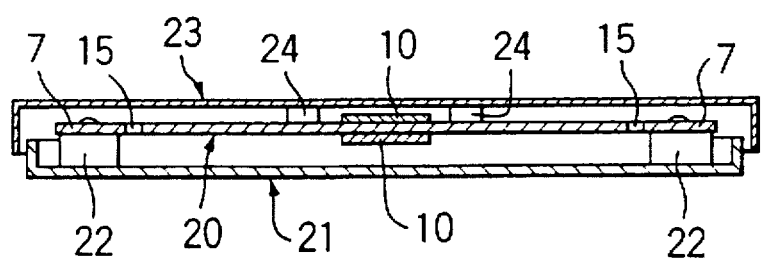
FIG. 2 is a cross-sectional view showing a low-profile weighing scale incorporating the low-profile load sensor as shown in FIG. 1.

The outer frame 7 has four holes 9 at the corners thereof for mounting the load sensor to the base of the scale and each of the platform mounting members 6 has two holes 8 at the both ends thereof. FIG. 2 is a cross-sectional view of a low-profile weighing scale incorporating the low-profile load sensor 20 as shown in FIG. 1. The low-profile load sensor 20 is mounted on the base 21 of the weighing scale with a predetermined gap therebetween, as seen in FIG. 2. More specifically, the outer frame 7 of the load sensor is secured to mounting spacers 22 on the base 21 by fastening the screws through the holes 9. The platform mounting members 6 are secured to mounting spacers 24 on the platform 23 by fastening the screws through the holes 8.

When a load is put on the platform 23, it is applied to four second torsional elastic couplings 2 in distributed condition. Then each of the load transmission beams 5 is caused to be slanted with the second torsional elastic couplings 2 acting as the load-applied-points and the first torsional elastic couplings 1 acting as the fulcrums, thereby exerting a force to the sensing device 4 at the ends of the beams 5. As the ends of the right and left beams 5 become slanted and lowered, the force is exerted to the sensing device 4 for bending it into a downward convex shape so that a compressive stress is produced on an upper surface of the sensing device 4 while an extensional stress is produced on a lower surface thereof. Therefore, the strain gauges on both surfaces of the sensing device 4 produce a symmetrical resistance change which can effectively be converted into an electrical signal by a Wheatstone bridge.

It is apparent that, because of the torsional elastic couplings used for both of the load-applied-points and the fulcrums of the load transmission beams 5, there is less resistance to the slanting movement of the beams 5 and the stylus-like portions forming those torsional elastic couplings can follow the horizontal displacement of the beams 5. Therefore, the load on the platform can reliably be transmitted to the point of action or the sensing device 4.

Figure 3:
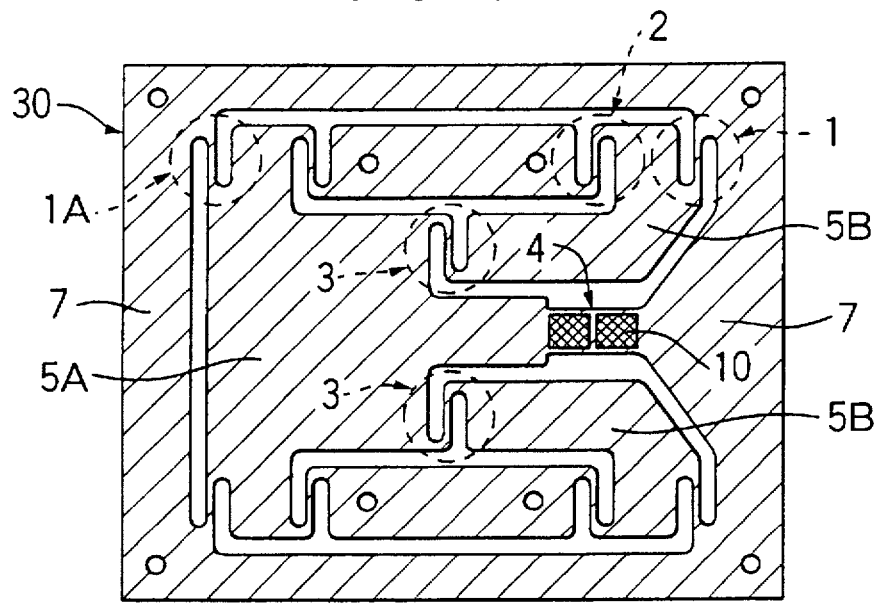
FIG. 3 is a plan view showing a low-profile load sensor according to another embodiment of the present invention.

FIG. 3 is a plan view showing a low-profile load sensor according to another embodiment of the present invention. This load sensor also comprises a single flat plate 30 which is formed in the same manner as that shown in FIG. 1, except that in this embodiment one of the load transmission beams is divided into two sub-beams 5B at the middle portion thereof. The other beam or main beam 5A has an end portion extending between said sub-beams 5B and a middle portion coupled to the ends of the sub-beams 5B via third torsional elastic couplings 3. A sensing device 4 having a small width is formed between the end of the main beam 5A and an outer frame 7, and strain gauges 10 are affixed on one surface of the sensing device 4.

As with the load sensor in FIG. 1, the load sensor shown in FIG. 3 is designed in such manner that the first torsional elastic couplings 1 act as the fulcrums, the second torsional elastic couplings 2 act as the load-applied-points, and the third torsional elastic couplings 3 act as the second load-applied-points. Therefore, a force on the sub-beams 5B is transmitted to the main beam 5A, then collectively to the end portion of the main beam 5A, and finally to one end of the sensing device 4 of which other end is coupled to the outer frame 7.

The low-profile load sensor as shown in FIG. 3 is also incorporated into the weighing scale, as in the case of the load sensor in FIG. 1. According to the arrangement in FIG. 3, when a load is put on the platform 23, the main beam 5A is made slanted about the first torsional elastic couplings 1A and the end portion thereof coupled to the sensing device 4 becomes lowered. Because of the sensing device 4 having one end coupled to the outer frame 7, the sensing device 4 receives a force for bending it into a shape of letter "S" so that both of a compressive stress and a extensional stress are produced on one and the same surface of the sensing device 4. Therefore, the strain gauges 10 on said one surface produces a symmetrical resistance change which can effectively be converted into an electrical signal by a Wheatstone bridge. The operation and effect of each torsional elastic coupling is equivalent to those of the arrangement in FIG. 1.

It is noted that the load sensor in FIG. 1 was described with reference to the arrangment in which the strain gauges are provided on both surfaces of the load sensor, while in FIG. 3 the load sensor was described as having the strain gauges on only one surface thereof. This is only for the purpose of illustration of the present invention, and therefore, any other constructions having different positional relation between the load-applied-point, the fulcrum and the point of action as well as different layout of the strain gauges may be used depending upon the intended applications. Furthermore, although the embodiments in which the strain gauges are affixed were described above, it is possible to form such strain gauges by thin or thick films. In this case, it is preferable that these strain gauges are formed on only one surface of the load sensor.

Figure 4:
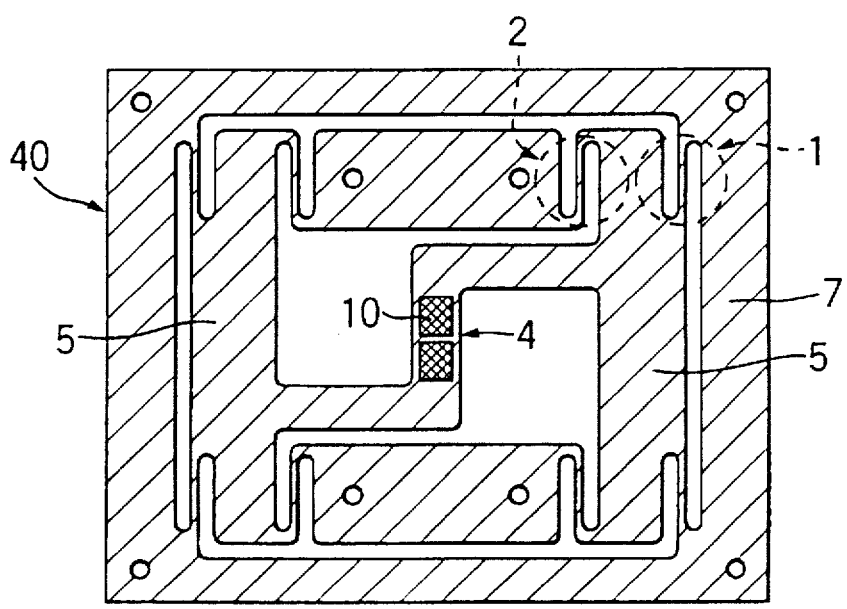
FIG. 4 is a plan view showing a low-profile load sensor according to a further embodiment of the present invention.

FIG. 4 is a plan view of a low profile load sensor according to a further embodiment of the present invention in which a sensing device 4 has different construction to those sensing devices in FIGS. 1 and 3. More specifically, the low profile load sensor in FIG. 4 comprises a single flat plate 40, as in the cases of FIGS. 1 and 3. In the embodiment of FIG. 4, however, the sensing device 4 is formed between the ends of "L" shaped load transmission beams 5. Therefore, as the ends of the beams 5 spaced apart in parallel become slanted and lowered, a torsional stress is produced in the sensing device 4 which causes a symmetrical resistance change in the strain gauges 10 affixed on one surface thereof.

Figure 5:
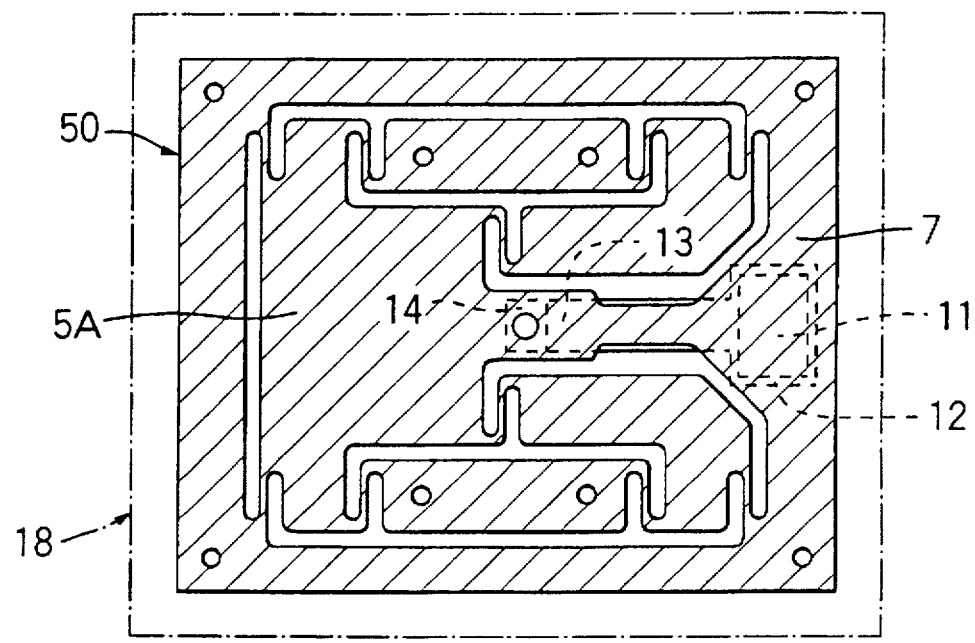
FIG. 5 is a plan view showing a low-profile load sensor according to a yet further embodiment of the present invention.
Figure 6:
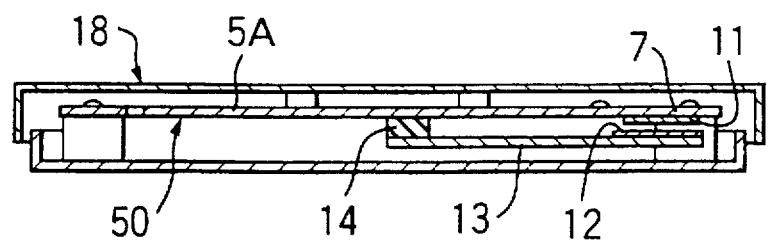
FIG. 6 is a cross-sectional view showing a low-profile weighing scale incorporating the low-profile load sensor as shown in FIG. 5.

FIG. 5 is a plan view of a low profile load sensor according to a yet further embodiment of the present invention and FIG. 6 is a cross-sectional view of a low profile weighing scale incorporating the load sensor of FIG. 5. The load sensor shown in FIG. 5 uses such mechanism that detects a deformation of the sensing device by the change in electrostatic capacity and converts it into an electrical signal. A fixed electrode 11 is positioned on an outer frame 7 of a flat plate 50 and an arm 13 is coupled to the end of a load transmission beam 5A via an insulation material 14. A movable electrode 12 is mounted on the end of the arm 13 facing the fixed electrode 11. According to this embodiment, when a load is put on a platform 18 the load transmission beam 5A becomes slanted and the end portion of the beam lowers, with the result that the electrostatic capacitance between the fixed and the movable electrodes 11 and 12 changes.

INDUSTRIAL APPLICABILITY

It is apparent from the foregoing that the low profile load sensor according to the present invention provides the significant advantages over the prior art in that, because of the torsional elastic couplings used, a force transmission mechanism having less transmission loss can be achieved, and therefore, the load sensor is especially suitable for use with a scale of measuring lighter weight. In addition, because of such torsional elastic couplings formed of only a part of the thin flat plate, the thickness of the load sensor may be reduced to such critical thickness that is capable of withstanding a rated load applied thereto.

Furthermore, because of the torsional elastic couplings formed by provision of the parallel slots extending in opposite directions, the machining process of the hinge portions and other portions can be effected in the same direction. It is futher expected that the product cost can be lowered because of no need for steps of assembling the components.

What is claimed is:

1. A low profile load sensor for use with a weighing scale having a base and a platform, said load sensor comprising:

an outer frame for mounting on said base;

platform mounting members for connecting to said platform;

a sensing device;

a plurality of load transmission beams positioned between said outer frame and said platform mounting members for receiving a load applied to said platform on a plurality of load-applied-points through said platform mounting members in distributed condition, for supporting said load on a plurality of fulcrums in distributed condition, and for collectively transmitting said load to said sensing device which then produces a strain or a deformation responsive to said load; and torsional elastic couplings for coupling said load transmission beams to said outer frame and to said platform mounting members;

wherein said load sensor comprises a single flat plate.

2. A low profile load sensor according to claim 1 wherein said torsional elastic couplings couple some of said plurality of load transmission beams together.

3. A low profile load sensor according to claim 1 in which each of said torsional elastic couplings is formed by an elongated stylus-like member provided between parallel slots in said flat plate, which slots are closely spaced apart and extend in opposite directions.

4. A low profile load sensor according to claim 1, wherein said outer frame, said platform mounting members, said load transmission beams, said sensing device and said torsional elastic couplings are formed by one of mechanical stamping and cutting of said flat plate.

5. A low profile load sensor according to claim 1, wherein said outer frame, said platform mounting members, said load transmission beams, said sensing device and said torsional elastic couplings are formed by a chemical etching of said flat plate.

6. A low profile load sensor according to claim 1, wherein said outer frame, said platform mounting members, said load transmission beams, said sensing device and said torsional elastic couplings are formed by an electrical discharge machining of said flat plate.

7. A low profile load sensor according to claim 1, wherein said single flat plate is formed by a molding process using molten material or powder material.

* * * * *